Patented Sept. 16, 1952

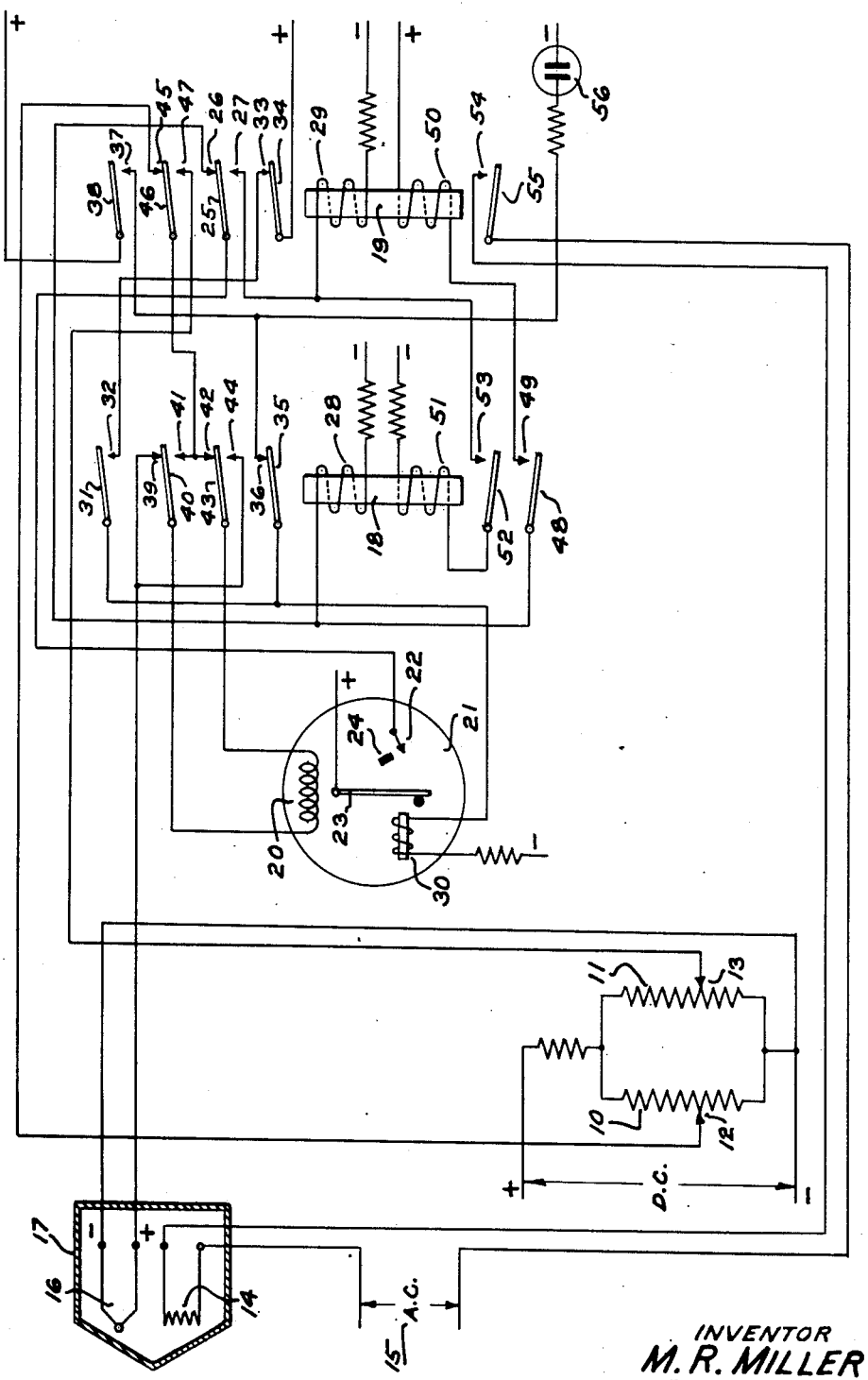

2,610,797

UNITED STATES PATENT OFFICE 2,610,797

TEMPERATURE CONTROL APPARATUS

Merton R. Miller, Lombard, Ill., assignor to Western Electric Company, Incorporated, New York, N. Y., a corporation of New York Application April 22, 1949, Serial No. 89,102

10 Claims. (Cl. 236—69)

This invention relates to control apparatus and more particularly to a device for automatically maintaining a heated element at a substantially constant temperature by controlling the source of heat to the element.

It is an object of the invention to provide a control device wherein the maximum and minimum temperature deviations may be adjusted independently in order to give a minimum temperature deviation in the thermal system being controlled.

In accordance with one embodiment of the invention, a control circuit is provided which is designed to control the temperature of a heated element such, for example, as a soldering iron tip. A thermocouple is associated with the heating element of the soldering iron tip in such a manner that the thermocouple E. M. F. is balanced against one of two separate D. C. potentials, depending on whether the heated element is approaching its maximum or minimum temperature. A relay system is associated with the thermocouple and the heating element in such a manner that an unbalance in the thermocouple circuit initiates various switching arrangements in the relay system to restore balanced conditions by controlling the current to the heating element. The relay system also determines automatically which of the two D. C. potentials the thermocouple E. M. F. is balanced against, depending on the direction of the temperature swing as controlled by the heating element at that particular time.

A complete understanding of the invention will be had by referring to the following detailed description taken in conjunction with the accompanying single figure drawing which is a diagrammatic illustration of one embodiment of the invention.

In this control circuit, there is provided a pair of direct current energized potentiometers 10 and 11 having movable contacts 12 and 13, respectively, which contacts may be set to determine the temperature at which heating current will be supplied to and cut off from a heating element 14. The heating element 14 may be connected to a suitable source of current such, for example, as an alternating current source 15 by a control circuit which operates under control of a thermocouple 16. Thermocouple 16 and heating element 14 may be mounted in an element 17 such, for example, as a soldering iron tip, the temperature of which it is desired to control. The thermocouple 16 is connected through the contacts of a relay 18 and a relay 19 in such a manner that it is alternately connected to the movable contacts 12 and 13 of the potentiometers 10 and 11 and simultaneously connected in series with an operating coil 20 of a meter-type relay 21, the electrical connection being such that a flow of current in the thermocouple circuit causes a pointer 23 on the meter-type relay 21 to be deflected to make contact with a fixed contact 22, where the pointer 23 is held by a holding magnet 24.

Pointer 23 is connected to the positive side of a source of direct current, as shown, and its deflection to make contact with contact 22 causes a circuit to be completed through a movable contact 25 and either a fixed contact 26 or a fixed contact 27 on relay 19 to winding 28 on relay 18, which is connected to the negative side of a source of direct current, as shown, or to winding 29 of relay 19, which is also connected to the negative side of a source of direct current, as shown. A restoring coil 30 on the meter-type relay 21 has one side connected to the negative side of a direct current source, as shown, and has its other side connected through a movable contact 31 and a fixed contact 32 of the relay 18 and a fixed contact 33 and a movable contact 34 of relay 19 to the positive side of a direct current source, as shown. Restoring coil 30 is also connected through a movable contact 35 and a fixed contact 36 of relay 18 and a fixed contact 37 and a movable contact 38 of relay 19 to the positive side of a source of direct current potential, as shown. Thus it will be obvious that the restoring coil 30 may be operated to restore the pointer 23 by one of two circuits, depending on the position of the contacts of the relays 18 and 19.

Relay 18 is also provided with contacts 39, 40, 41, 42, 43 and 44, the function of which is to reverse the connections to operating coil 20 when the connection from the thermocouple 16 is transferred from one of the movable contacts 12 and 13 of the potentiometers 10 and 11 to the other of the movable contacts, this reversal of connections being necessary because of the reversal of the direction of current flow in the thermocouple circuit when the thermocouple connection to the movable contact of one potentiometer is broken and connection to the movable contact of the other potentiometer is made, it being noted that in the case of a decreased temperature, the potential across the appropriate potentiometer will cause the current flow, and in case of an increased temperature, the increased potential of the thermocouple will cause the current flow, and these flows will be in opposite directions.

Connection from the thermocouple 16 to the appropriate movable contact of the potentiometers is provided through contacts 45, 46 and 47 of relay 19, contact 46 being movable between the contacts 45 and 47, which are stationary. Relays 18 and 19 are capable of being locked operated in series, for reasons which will more fully appear in the description of the operation of the circuit. To provide suitable connections for locking the relays 18 and 19 operated, the winding 28 on relay 18 may be connected through a pair of contacts 48, 49 on relay 18 to a winding 50 on relay 19, the winding 50 being connected to the positive side of a source of direct current, as shown. Thus it is obvious that under certain conditions the windings 28 and 50 may be energized in series, thus operating both relays, and since the only contacts which may break this circuit are the contacts 48, 49, which are held closed by the operation of relay 18, it is obvious that some additional means must be provided to cause the relay 18 to release. For this purpose, a winding 51 is provided on relay 18, the winding 51 having one side connected to the negative side of a source of direct current, as shown. The circuit to winding 51 is completed through a pair of contacts 52, 53 on relay 18, contacts 27, 25 on relay 19, contact 22 of the meter-type relay 21, and pointer 23 to the source of positive direct current connected to the pointer 23. Therefore, it will be seen that deflection of the pointer 23 to make contact with the contact 22 at a time when the contacts 25, 27 and 52, 53 are closed will cause energization of winding 51 in magnetic opposition to winding 28, thereby causing relay 18 to release.

All of the operations of the circuit described hereinbefore are so coordinated as to control the opening and closing of a pair of contacts 54, 55 on relay 19 to control the flow of current to the heating element 14, and it will be observed that a neon glow tube 56, which has one side connected to the negative side of a source of direct current, as shown, may also be provided to give a visual indication that the contacts 54, 55 are closed, the other side of the neon indicator 56 being connected through contacts 37, 38 to the positive side of a source of direct current whenever the relay 19 operates to close contacts 54, 55.

In the operation of the device, assuming a point in the operation where the current to the heating element 14 is turned off, the contacts of relays 18 and 19 will be positioned as shown in the drawing. At this time, the thermocouple E. M. F. is decreasing as the element cools and is being opposed by the potential which was preset on potentiometer 10. As the thermocouple E. M. F. decreases below the value set on the potentiometer 10, the current through the operating coil 20 of the meter-type relay 21 causes the pointer 23 to be deflected away from its back stop and to make contact with the contact 22, where it is held by the action of the holding magnet 24. Closure of the contacts of the meter-type relay 21 causes the winding 28 of relay 18 to be energized through a circuit from positive potential through pointer 23, fixed contact 22, relay contacts 25 and 26, through the winding 28 to negative, thus operating relay 18. Operation of relay 18 extends positive potential from the closed contacts of the meter-type relay 21 to the winding 50 of relay 19; however, relay 19 does not operate at this time because the other side of its winding 50 is also connected to positive potential. The operation of relay 18 also reverses the operating coil 20 of the meter-type relay 21 at contacts 39, 40, 41, 42, 43 and 44 and extends positive potential from the normally closed contacts 33 and 34 through contacts 31 and 32 to the restoring coil 30. Operation of the restoring coil 30 removes the positive potential from the winding 28 of relay 18, thereby causing relay 19 to operate by virtue of the circuit from positive potential on the winding 50 through the winding 28 to negative potential; thus, relays 18 and 19 are locked operated in series. The operating of relay 19 closes contacts 54, 55 to extend power to the heating element 14 and extends positive potential through its contacts 37 and 38 to indicator tube 56, thereby causing the tube 56 to light. At the same time, the operation of relay 19 transfers the thermocouple balancing circuit from the potentiometer 10 to the potentiometer 11 at contacts 45, 46 and 47, transfers the meter-type relay contact circuit from the primary winding of relay 18 to the primary winding of relay 19 at contacts 25, 26 and 27, and breaks the circuit to the restoring coil 30 at contacts 33 and 34.

At this point in the operation, when the power to the heating element 14 has been turned on, as described above, relays 18 and 19 are locked operated in series and the thermocouple E. M. F. is increasing as the element 16 heats; however, no action occurs until the thermocouple E. M. F. rises to a value exceeding the potential across potentiometer 11. When the thermocouple E. M. F. exceeds the value of the potential across potentiometer 11 by a predetermined amount, the pointer 23 again moves to the right, closing the contacts of the meter-type relay 21. This action extends positive potential from the pointer 23 through the fixed contact 22, relay contacts 27 and 25, and relay contacts 52 and 53 to the winding 51. Since the winding 51 is connected in opposition to the winding 28, energization of the winding 51 in magnetic opposition to winding 28 will cause relay 18 to release. The releasing of relay 18 opens the series connection between its winding 28 and the winding 50 of relay 19 at contacts 48 and 49; however, the relay 19 does not release at this time because it is locked operated by its winding 29 through contacts 27 and 25 to the pointer 23 of the meter-type relay. The releasing of relay 18 also opens the circuit to its winding 51 at contacts 52 and 53, reverses the operating coil 20 at contacts 39, 40, 41, 42, 43 and 44, and extends positive potential from contacts 38 and 37 through its own contacts 36 and 35 to operate the restoring coil 30. Operation of the restoring coil 30 retracts the pointer 23, thereby removing the positive potential from the contacts 25 and 27 and the winding 29, thus causing relay 19 to release. The releasing of relay 19 opens the circuit to the restoring coil 30 and to the neon lamp 56 at contacts 37 and 38, transfers the thermocouple balancing circuit from potentiometer 11 to potentiometer 10 at contacts 45, 46 and 47, and opens the contacts 54 and 55 to open the circuit to the heating element 14 under control.

The control circuit described herein has been described in conjunction with an electrically heated element; however, it is to be understood that the principles of operation would not be changed if other types of heating medium were employed. For example, the relay 19 may be designed to control a valve instead of contacts 54, 55, thereby to control the flow of a liquid or gaseous heating medium to heat an element.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a temperature control device wherein an element is heated by an electrical current, the combination with a thermocouple responsive to the temperature of said element to produce a direct current proportional thereto, of a pair of separately adjustable direct current energized potentiometers alternately connectible in series circuit with said thermocouple to provide a current in opposition to the current produced by said thermocouple, means connecting one of said potentiometers in said circuit, means responsive to a flow of current in said circuit caused by an increased temperature of said element to stop the flow of heating current to said element and simultaneously disconnect said one potentiometer from said circuit and substitute the other potentiometer therefor, and means responsive thereafter to a flow of current in said circuit in an opposite direction caused by a decreased temperature of said element to start the flow of heating current to said element and simultaneously disconnect said other potentiometer and connect said one potentiometer in place thereof.

2. In a temperature control device in combination, a heating element energizable by a source of heating current, a heated element, a thermocouple responsive to the temperature of said heated element to produce a direct current proportional thereto, a meter-type relay having its deflecting coil connected in series with said thermocouple, a pair of direct current energized separately adjustable potentiometers alternately connectible in series with said thermocouple and said meter-type relay deflecting coil, means connecting one of said potentiometers in series with said thermocouple and said deflecting coil whereby the current flowing across said potentiometer opposes the current generated by said thermocouple, a pair of direct current relays energizable by the deflection of a pointer on said meter-type relay, said deflection being initiated by a flow of current through said deflecting coil, and switch means responsive to a flow of current in said pair of relays to control the flow of current to said heating element, remove said one potentiometer from said thermocouple-deflecting coil circuit and substitute the other potentiometer therefor, and reverse the electrical connections to said deflecting coil.

3. In a device for controlling the flow of current to a heating element, the combination with a thermocouple, of a pair of variable resistances, a source of potential across said resistances, relay means alternately connecting said resistances in series with said thermocouple and simultaneously controlling said flow of heating current, and means responsive to a predetermined thermocouple temperature change to actuate said relay means.

4. A device for controlling the temperature of a heated element comprising a heating element, a source of current for said heating element, switch means for controlling the current to the heating element, a thermocouple, first means connected to said thermocouple for opposing the E. M. F. of the thermocouple, second means for separately opposing the E. M. F. of the thermocouple, relay means responsive to a condition of unbalanced E. M. F. between the thermocouple and said first opposing means for controlling said switch means and for simultaneously disconnecting said one opposing means from the thermocouple, and substituting said second opposing means therefor.

5. In a temperature control device wherein an element is heated by a heating means, the combination with a thermocouple responsive to the temperature of said element to produce a direct current proportional thereto of a pair of separately adjustable direct current energized potentiometers alternately connectible in series circuit with said thermocouple to provide a current in opposition to the current produced by said thermocouple, means connecting one of said potentiometers in said circuit, means responsive to a flow of current in said circuit caused by an increased temperature of said element to render the heating means for the heated element inoperative and simultaneously disconnect said one potentiometer from said circuit and substitute the other potentiometer therefor, and means responsive thereafter to a flow of current in said circuit in an opposite direction caused by a decreased temperature of said element to render the heating means for said element operative and simultaneously disconnect said other potentiometer and connect said one potentiometer in place thereof.

6. In a temperature control device in combination, an element heated by a supply of heating medium, a thermocouple responsive to the temperature of said heated element to produce a direct current proportional thereto, a meter type relay having its deflecting coil connected in series with said thermocouple, a pair of direct current energized separately adjustable potentiometers alternately connectible in series with said thermocouple and said meter type relay deflecting coil, means connecting one of said potentiometers in series with said thermocouple and said deflecting coil whereby the current flowing across said potentiometer opposes the current generated by said thermocouple, a pair of direct curent relays energizable by the deflection of a pointer on said meter type relay, said deflection being initiated by a flow of current through said deflecting coil, and means responsive to a flow of current in said pair of relays to control the flow of heating medium to said element, remove said one potentiometer from said thermocouple deflecting coil circuit and substitute the other potentiometer therefor and reverse the electrical connection to said deflecting coil.

7. In a device for controlling the flow of heating medium to a heated object, the combination with a thermocouple of a pair of variable resistances, a source of potential across said resistances, relay means alternately connecting said resistances in series with said thermocouple and simultaneously controlling said flow of heating medium, and means responsive to a predetermined thermocouple temperature change to actuate said relay means.

8. A current responsive temperature control circuit comprising a heating element, a source of heating medium for heating said element, a thermocouple, a first resistance, a second resistance, a source of direct current connected across each of said resistances, means connecting said resistances alternately in series circuit with said thermocouple on successive actuations thereof, and means responsive to a predetermined flow of current in said thermocouple circuit for actuating the connecting means.

9. In a temperature control device wherein an element is heated by an electrical current, the combination of a source of potential, a thermocouple responsive to temperature of said element to produce an E. M. F. proportional to the temperature, a starting resistance, a stopping resistance, a source of D. C. potential connected to the resistances, relay means operable upon one actuation thereof for connecting the thermocouple in series with one of said resistances and the element to said first source of potential and operable upon alternate actuations thereof for connecting the thermocouple to the other resistance and disconnecting the said element from said first source of current, and sensitive relay means responsive to the E. M. F. of the thermocouple for actuating the relay means when the thermocouple is at a predetermined maximum temperature and for actuating the relay means when the thermocouple is at a predetermined minimum temperature.

10. In a temperature control device wherein an element is heated by an electrical current, the combination of a source of potential, a thermocouple responsive to the temperature of said element to produce an E. M. F. proportional to the temperature thereof, a starting resistance, a stopping resistance, means for supplying said element with current, means for connecting the stopping resistance in series-opposition with the thermocouple and disconnecting the starting resistance from the thermocouple when the current-supplying means is connected to said element, means for connecting the starting resistance in series-opposition with the thermocouple and disconnecting the stopping resistance from the thermocouple when the current-supplying means is disconnected from said element, and relay means responsive to predetermined changes in E. M. F. of the thermocouple for actuating said connecting and disconnecting means and for connecting the source of potential to said element and disconnecting said source from said element.

MERTON R. MILLER.

REFERENCES CITED

The following references are of record in the file of this patent:

UNITED STATES PATENTS

| Number | Name | Date |
|---|---|---|
| 1,815,061 | Harsch et al. | July 21, 1931 |
| 2,046,830 | Wilhjelm | July 7, 1936 |
| 2,085,855 | Hunt | July 6, 1937 |
| 2,085,856 | Hunt et al. | July 6, 1937 |
| 2,139,504 | King | Dec. 6, 1938 |
| 2,148,491 | Moore | Feb. 28, 1939 |
| 2,220,028 | Smith | Oct. 29, 1940 |
| 2,376,488 | Jones | May 22, 1945 |